INVENTORS
Reynold Happe
Louis F. Daman

ATTORNEY

May 15, 1962  R. HAPPE ET AL  3,034,275
COMBINATION UNIT GRASS EDGER AND TRIMMER
Filed July 28, 1958  3 Sheets-Sheet 3

WITNESS
William Martin

INVENTORS
Reynold Happe
Louis F. Daman
BY
J. G. Stanford
ATTORNEY

United States Patent Office 3,034,275
Patented May 15, 1962

3,034,275
COMBINATION UNIT GRASS EDGER
AND TRIMMER
Reynold Happe, Princeton, and Louis F. Daman, Martinsville, N.J., assignors to Diehl Manufacturing Company, Somerville, N.J., a corporation of New Jersey
Filed July 28, 1958, Ser. No. 751,261
1 Claim. (Cl. 56—25.4)

This invention relates to motor driven rotary trimmers and edgers for lawns and more specifically relates to a portable wheeled implement which may be readily adapted for either grass trimming or lawn edging, including the selection of a cutter speed compatible wtih the function chosen.

It is a primary object of this invention to provide, in a single dual-function lawn tool, a simple, relative adjustability of parts to provide optimum arrangements for the trimming function and for the edging function, including simple means for selecting cutter speeds which are optimum for each function.

It is a further object of this invention to provide a power-operated lawn tool having a wheeled carriage for support of the tool for movement over the ground when it is used as a trimmer and also when it is used as an edger.

It is another object of this invention to provide a dual-function lawn tool having a single cutter and simple gear-shift means for effecting changes in cutter speed.

Other features and advantages of the invention will appear from the following description taken in connection with the drawings wherein.

Figure 1:
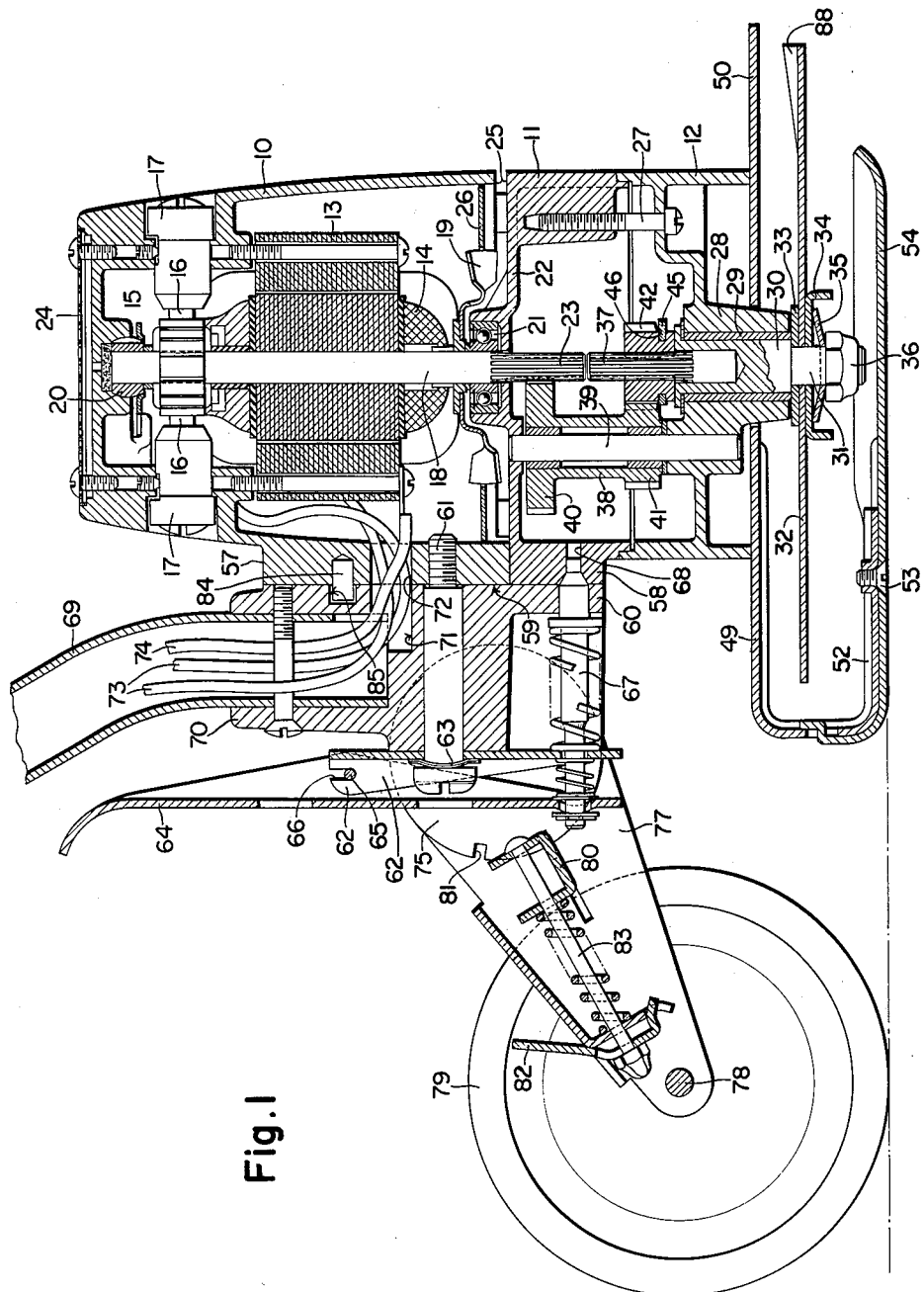
FIG. 1 is a vertical sectional view taken through a device embodying the invention and adjusted for trimmer use.

Referring now to FIG. 1, the main body of the combination trimmer edger comprises a motor housing 10, a gear housing 11 and a gear housing cover 12 preferably formed by die-casting and inter-fitted to form smooth external contours of pleasing appearance. Located within the motor housing 10 is an electric motor comprising a stator 13, a rotor 14, a commutator 15, and brushes 16—16 held within insulated brush boxes 17—17 secured in the housing 10.

Figure 4:
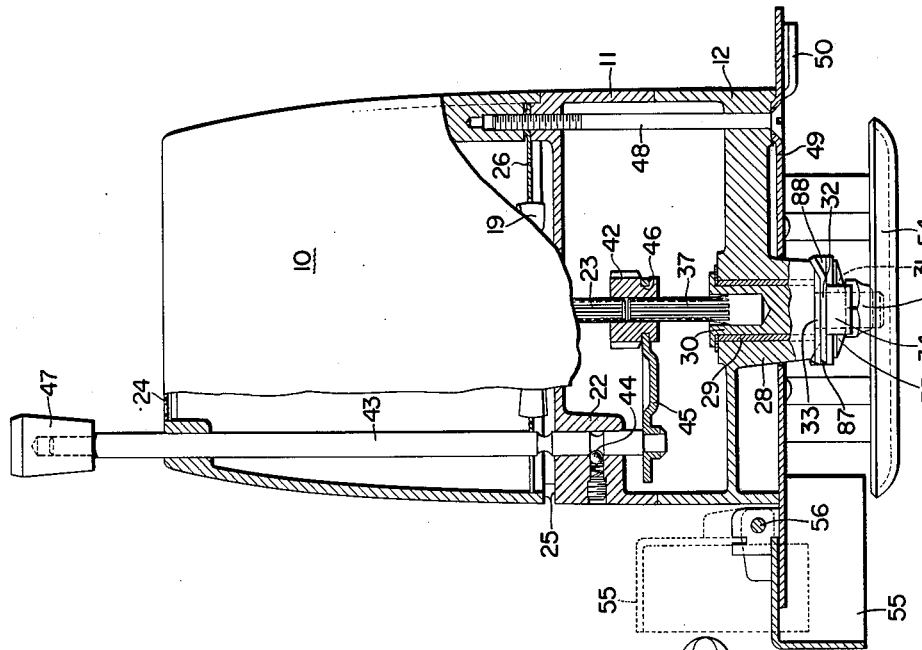
FIG. 4 is a front end elevation partly in section on the line 4—4 of FIG. 2.
Figure 3:
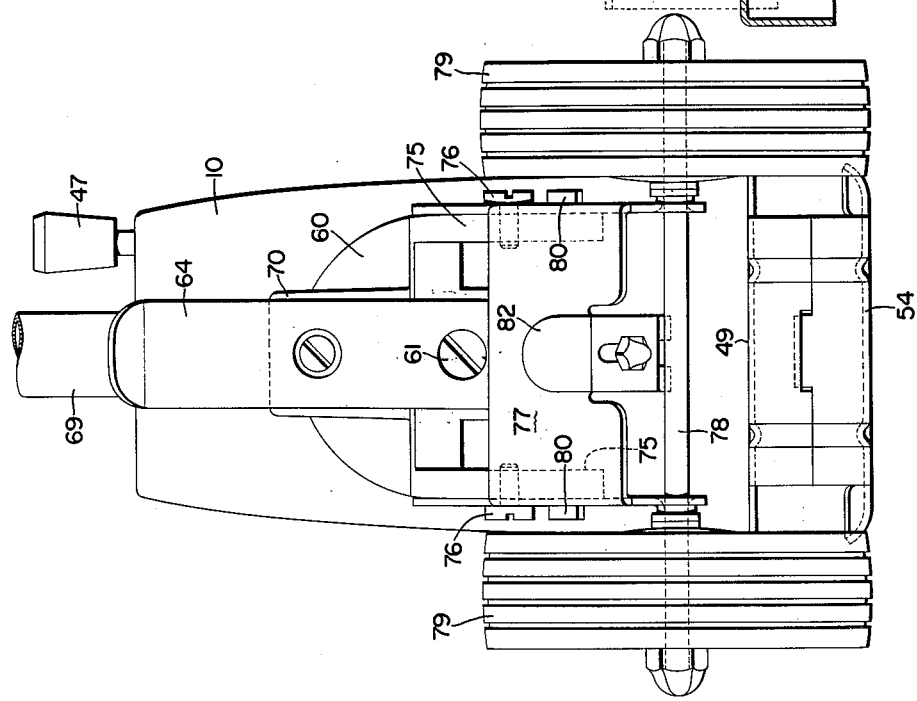
FIG. 3 is a rear end elevation view of the device of FIG. 1.

A rotor shaft 18, carrying fan 19, is journaled at one end in a self-aligning sleeve bearing 20 and at the other end in a ball bearing 21 carried in wall 22 of the gear housing 11. The wall 22 is apertured to permit entry of splined end 23 of the shaft 18 into the interior of the gear housing 11. A removable perforate screen 24 permits entry of cooling air at the commutator end of the motor. Gap portions 25 in the joint between the motor housing 10 and gear housing 11 provide an exit for this air. A baffle ring 26 held between the two housings, as seen best in FIG. 4, directs the cooling air to the fan 19 to increase the flow efficiency.

The gear-housing cover 12 is secured to the gear housing 11 by screws 27 and is formed with a boss 28 which is apertured to receive a bushing 29. Journaled in the bushing 29 is a power spindle 30 having a reduced terminal portion 31 to which is secured frictionally a cutter blade 32 through the agency of friction washers 33 and 34, spring washer 35 and lock-nut 36. This forms a simple slip clutch for limited torque transmission and prevents adverse stalling of the motor when the blade encounters relatively immovable objects. The blade 32 is formed with cutting edges 87 and turned-up-corners 88 to provide fan action. Direction of rotation is indicated by the arrow in FIG. 5.

A stub shaft 37 of identical diameter and spline dimensions as the splined end 23 of motor shaft 18 is axially aligned with but spaced slightly from the motor shaft and is secured to the power spindle 30 as shown. As seen best in FIG. 1, a stepped idler gear 38 journaled on pin 39 has its large pinion 40 meshed with the splined shaft 23 and its small pinion 41 may be meshed with a similar pinion gear 42 slidable endwise upon and meshed internally with the spline stub shaft 37 to form a speed reduction tranmission from motor shaft to cutter blade. This is the low-speed position used for edging. The slidable pinion 42 may also be moved out of mesh with the idler pinion 41 and along the stub shaft 37 on the spline until, as seen best in FIG. 4, it joins the motor shaft 18 with the stub shaft 37 for direct torque transmission. This is the high-speed position used for trimming.

The shift of the slidable pinion 42 is effected by a push-rod 43 equipped with a spring-loaded ball detent 44, which rod operates a fork 45 engaging a peripheral groove 46 in the pinion 42. The push-rod 43 extends through the wall 22 and through the motor housing 10 and terminates at the top end in a grip knob 47 for convenient manipulation.

Figure 5:
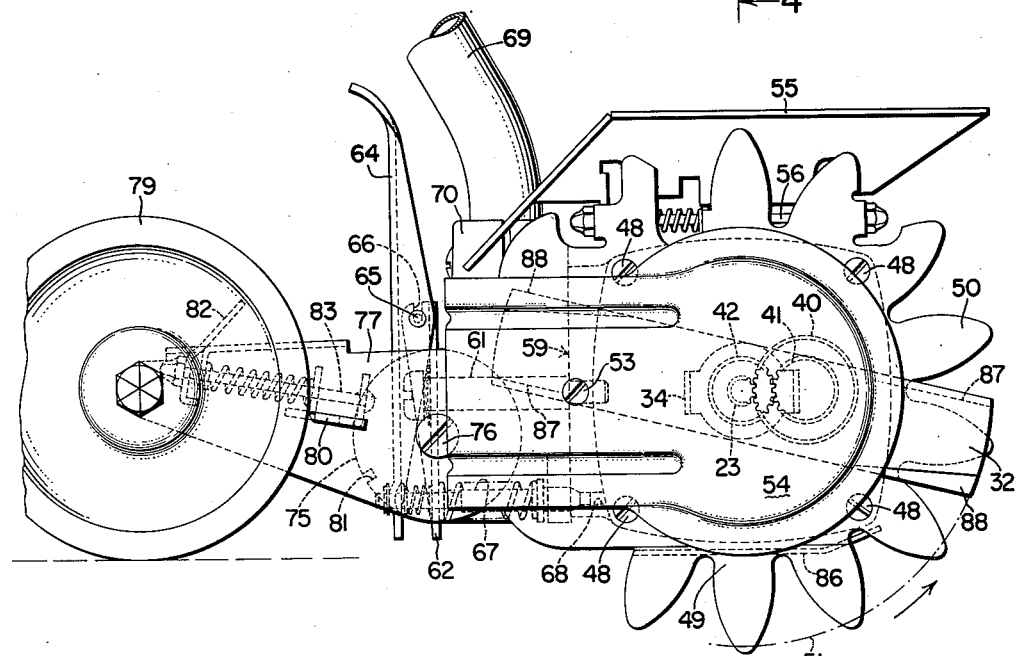
FIG. 5 is a side elevation view of the device of FIG. 1 adjusted for use as an edger.

Secured to the gear-housing cover 12 by means of screws 48 threaded into bosses in the motor housing 10 is a generally circular guard plate 49 formed with peripheral notched portions 50 as seen best in FIG. 5. The cutter blade 32 rotates in a plane parallel and adjacent to the guard plate 49 which has a maximum diameter slightly greater than that of the path 51 of the cutter tip. Secured to the guard plate 49 by spot welding, for example, is a skid plate 86 as seen best in FIGS. 2 and 5. This skid plate protects the motor housing 10 and helps support the tool when it is moved over the ground as an edger, as in FIG. 5.

The guard plate 49 is formed at one side with a ribbed bent-under portion 52 (FIG. 1) which presents a limb parallel to the upper notched portions 50 and positioned on the opposite side of the cutter blade 32 therefrom. Removably secured to this limb portion 52 by means of the single screw 53 is a dished skid or runner 54 for assisting in supporting the tool for movement over the ground when used as a trimmer as shown.

A cutter guard 55 hinged to pivot pin 56 may be positioned as shown in FIG. 5 to cover the top of the rotating cutter blade to prevent dirt and stones from being thrown upwards into the operator's face when using the tool as an edger. Otherwise this hinged guard 55 is folded back out of the way as shown in dotted lines in FIG. 4 to expose more of the cutter path for trimming action.

Thus far there has been described a composite motor-driven cutter with guards and having a built-in selectable two-speed power transmission. There will now be described means for adjustably mounting this composite unit on a supporting hand-guided, wheeled carriage so that it may be shifted readily between different locked positions relative to the carriage depending on the choice of trimmer or edger function.

Figure 2:
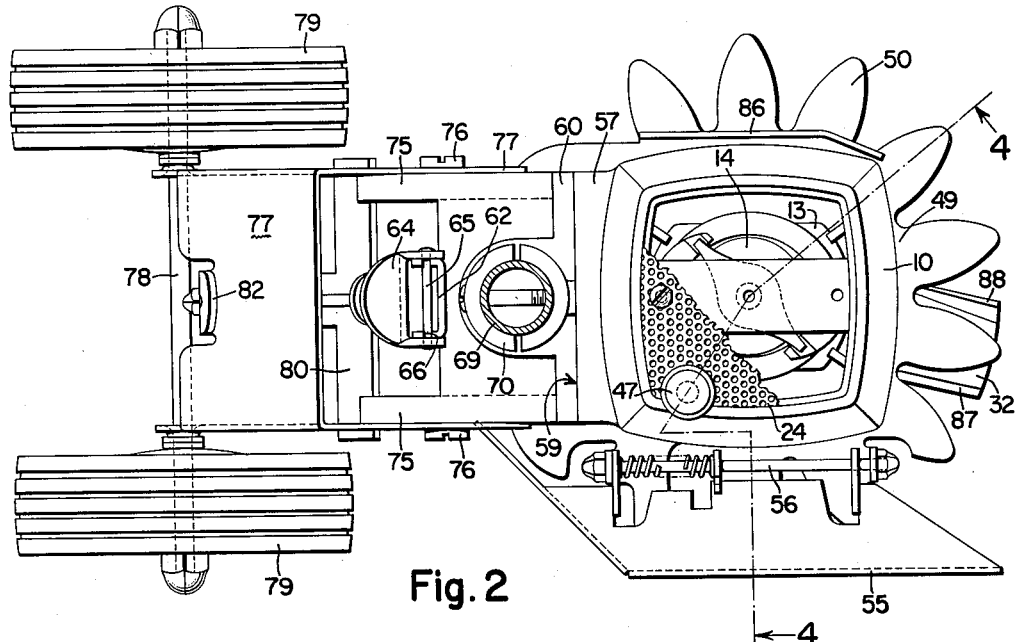
FIG. 2 is a top plan view partly in section of the device of FIG. 1.

An external boss 57 formed on the side of the motor housing 10 coextends with a similar boss 58 formed on the gear housing 12 to provide a flat bearing surface 59 of considerable extent against which is received in face-to-face relation a yoke casting 60 as seen best in FIGS. 1 and 2. The yoke casting 60 pivots about the axis of a shouldered screw 61 threaded into the motor housing. The motor housing 10, gear housing 11, and cutter 32 pivot as a unit relatively to the yoke 60. An upstanding bracket 62 is secured against the yoke casting 60 under the head of screw 61, and a spring washer 63 provides a resilient securement. A lever 64 hinged on a pivot pin 65 carried in slots 66—66 in the bracket 62 operates to retract a spring-pressed indexing pin 67 from engagement with matching spaced holes 68 in the bosses 57 and 58 to provide means for indexing the composite motor-driven cutter unit from the vertical or trimmer position shown in FIG. 1 to the horizontal or edger position shown in FIG. 5.

A hollow handle 69 is fixed in a split socket portion 70 of the yoke casting and communicates with a recess 71, arcuate about the axis of the screw 61, and with an aperture 72 in the boss 57 to carry electrically conducting power leads 73 and a ground lead 74 housed in the handle 69 to the interior of the motor housing 10. A pin 84, secured in the boss 57, engages an arcuate slot 85 formed in the yoke 60 to provide limit stops to prevent excess rotation of the yoke 60 relative to the motor housing 10 which would otherwise be detrimental to the leads 73 and 74.

The yoke casting 60 is also formed with spaced, rearwardly extending arms 75—75 as seen best in FIG. 2. Pivotally secured to the arms 75—75 by means of screws 76—76 is a sheet-metal formed bracket or trunnion 77 carrying a fixed axle 78 on which are journaled wheels 79—79.

The wheel and trunnion assembly may be adjusted for predetermined angular positions about the axis defined by the screws 76—76 by means of a spring-pressed plate 80 which may be retracted manually from engagement with angularly-spaced notches 81 made in the arms 75 of the yoke 60 by manipulation of a lever 82 which operates a pull-rod 83 as seen best in FIG. 1. This wheel-height adjustment establishes the proper wheel level for trimming as in FIG. 1 and for edging as in FIG. 5. Any other adjustment to vary the cutting depth may be made conveniently by merely tilting the handle 69 the required amount relative to the ground line.

It will be perceived above that there has been described a single compact lawn cutting tool, readily adjustable to configurations and speeds which are optimum for two separate functions. This has been accomplished by providing a unitary motor and cutter assembly composed of parts 10, 11, and 32, and a unitary handle and wheeled carriage assembly composed of parts 60, 69, 77, and 79, which assemblies may be selectively positioned relatively to each other for a desired function.

Having thus set forth the nature of the invention, what we claim herein is:

1. A combination dual-function grass trimmer and edger comprising a composite motor and gear housing formed with an external boss providing a flat surface, a yoke member bearing against said surface and selectively rotatable about a first axis normal to said surface, a manipulating handle fixedly secured to said yoke member, a wheeled carriage pivotally mounted on said yoke and selectively rotatable about a second axis normal to said first axis, an electric motor in said housing, a spindle journaled in said housing, a cutter frictionally secured to said spindle, and selectable speed-ratio gear trains contained within said housing for transmitting torque from said motor to said spindle.

References Cited in the file of this patent

UNITED STATES PATENTS

| | | |
|---|---|---|
| 1,799,987 | Rauen | Apr. 7, 1931 |
| 1,805,927 | Sharp | May 19, 1931 |
| 1,876,388 | Bethune | Sept. 6, 1932 |
| 2,629,220 | Grieder | Feb. 24, 1953 |
| 2,707,858 | Norton et al. | May 10, 1955 |
| 2,719,400 | Lesesne | Oct. 4, 1955 |
| 2,721,433 | Berdan | Oct. 25, 1955 |
| 2,740,246 | Smith et al. | Apr. 3, 1956 |
| 2,759,319 | Smith | Aug. 21, 1956 |
| 2,774,207 | Sedgwick | Dec. 18, 1956 |
| 2,795,915 | Miller | June 18, 1957 |
| 2,867,960 | Stiles et al. | Jan. 13, 1959 |
| 2,932,144 | Garner et al. | Apr. 12, 1960 |
| 2,938,323 | Livingston et al. | May 31, 1960 |